United States Patent [19]

Gründler et al.

[11] 4,129,976
[45] Dec. 19, 1978

[54] APPARATUS FOR FORMING, FILLING AND CLOSING BAGS

[75] Inventors: Bruno Gründler, Neuhausen am Rheinfall; Hans Heinzer, Beringen; Werner Müller, Neuhausen am Rheinfall, all of Switzerland

[73] Assignee: SIG Schweizerische Industrie-Gesellschaft, Neuhausen am Rheinfall, Switzerland

[21] Appl. No.: 835,426

[22] Filed: Sep. 21, 1977

[30] Foreign Application Priority Data

Sep. 30, 1976 [CH] Switzerland ............... 12370/76

[51] Int. Cl.² ........................................... B65B 9/12
[52] U.S. Cl. ........................................ 53/552; 93/18
[58] Field of Search .............. 53/28, 180 M, 182 M; 93/12 R, 18, 35 SB, 82

[56] References Cited

U.S. PATENT DOCUMENTS

Re. 27,302  2/1972  Schneider et al. ............ 53/180 M

FOREIGN PATENT DOCUMENTS 2,229,691  1/1974  Fed. Rep. of Germany ........ 53/182 M
512,116    5/1974  U.S.S.R. ........................... 53/180 M Primary Examiner—Robert Louis Spruill
Attorney, Agent, or Firm—Spencer & Kaye

[57] ABSTRACT

An apparatus for forming, filling and closing bags has a hollow mandrel on which a hose is continuously formed from a sheet; two vertically reciprocating and horizontally oppositely movable shoes underneath the mandrel for cyclically pressing together a first hose portion and providing a transverse seam thereacross as the hose and the shoes move downwardly in unison; a folding device cyclically forming bottom flaps from a second hose portion at opposite sides of the hose at the lower end of the mandrel above the first hose portion; a clamping device for firmly grasping the hose at the second hose portion and backing the bottom flaps along the entire hose cross section as it pulls the hose downwardly from the mandrel while moving simultaneously downwardly with the shoes and while the hose part that terminates at the bottom flaps is being filled with goods by gravity; and a cutting device for cutting through the transverse seam when the shoes and the clamping device have pulled the hose to a predetermined low position for severing a previously filled hose portion as a separated, sealed bag from the upstream, still coherent hose.

6 Claims, 13 Drawing Figures

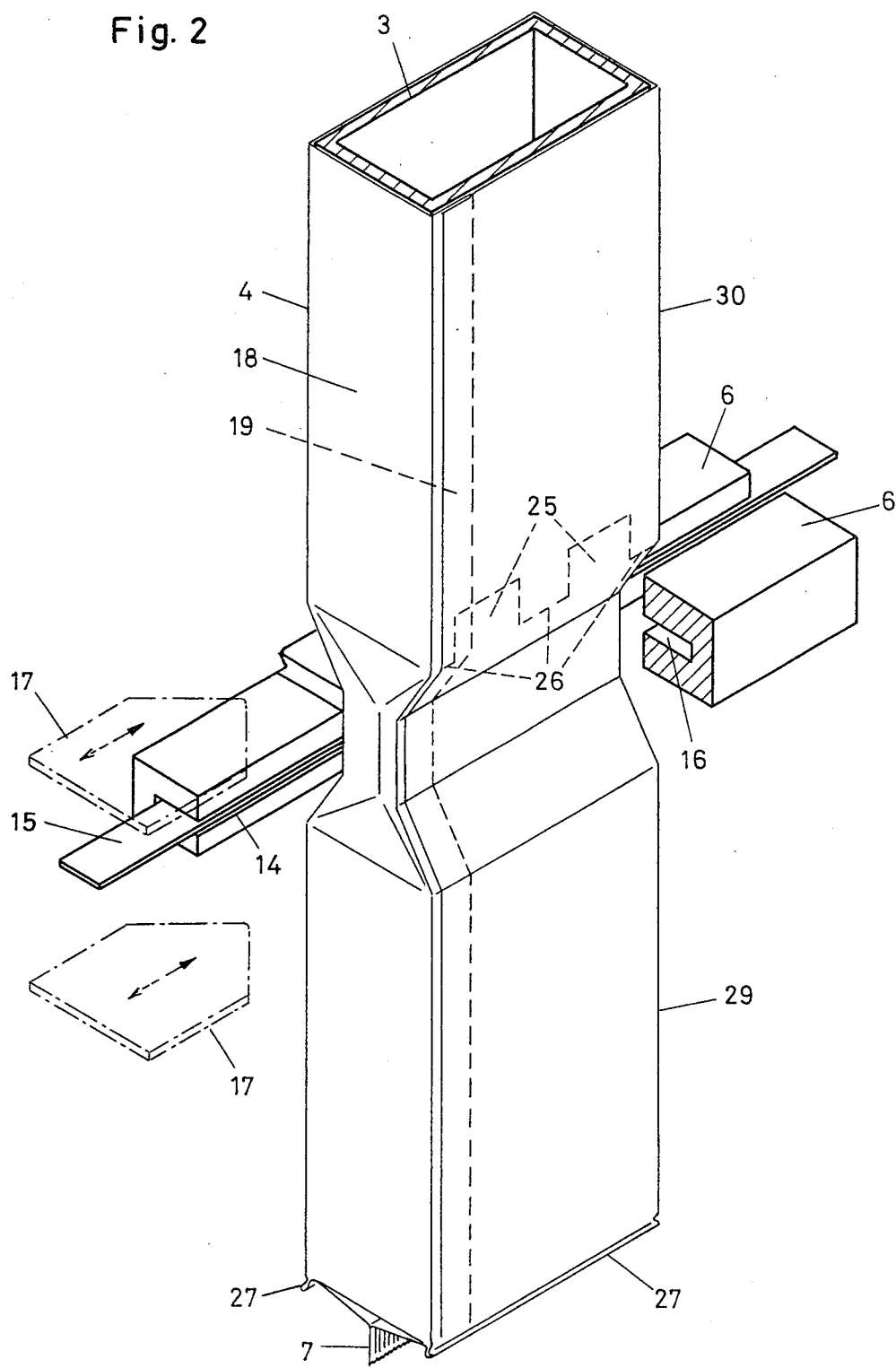

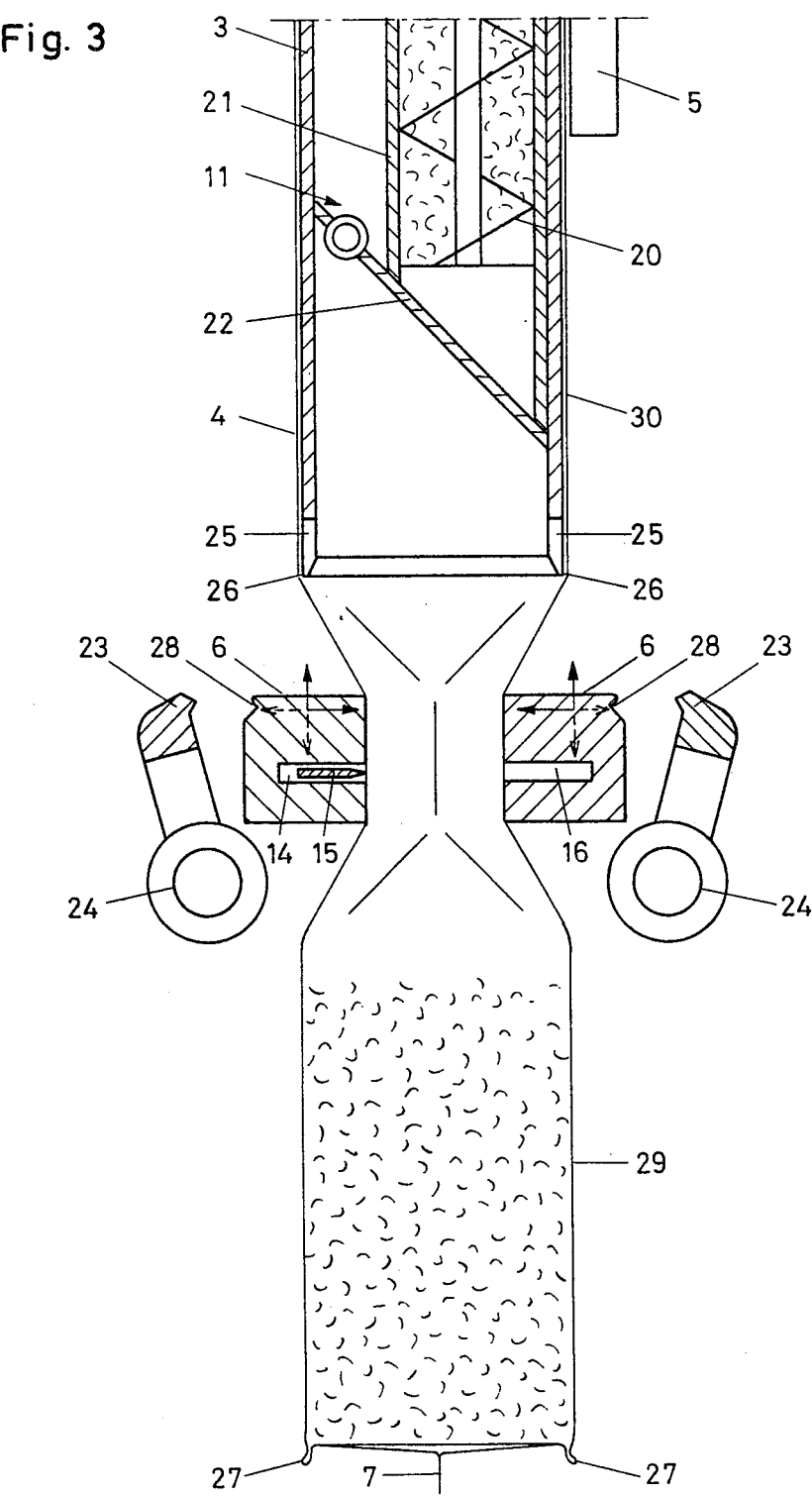

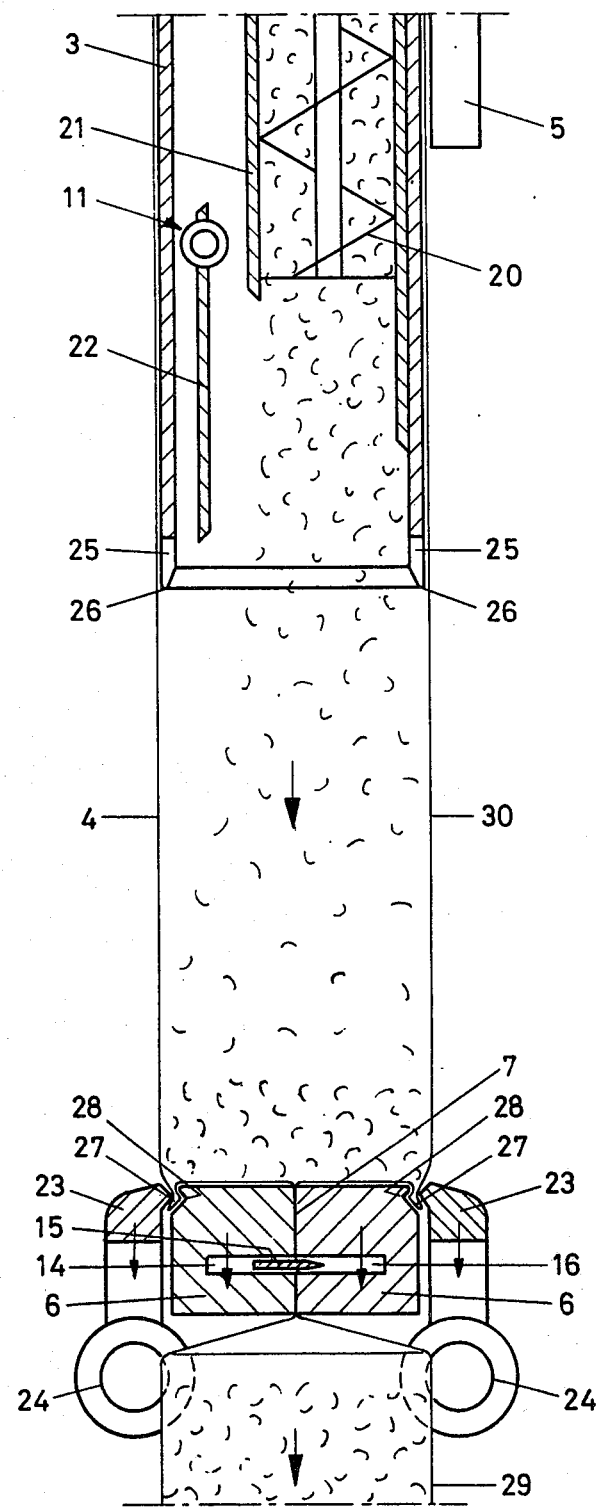

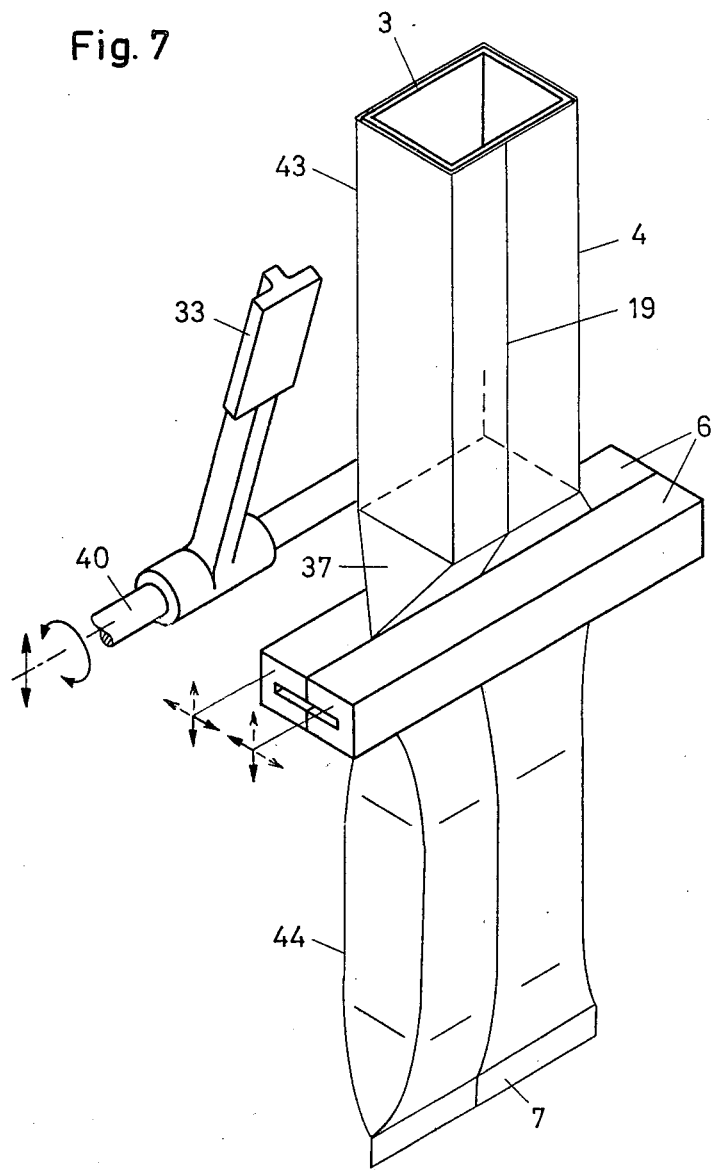

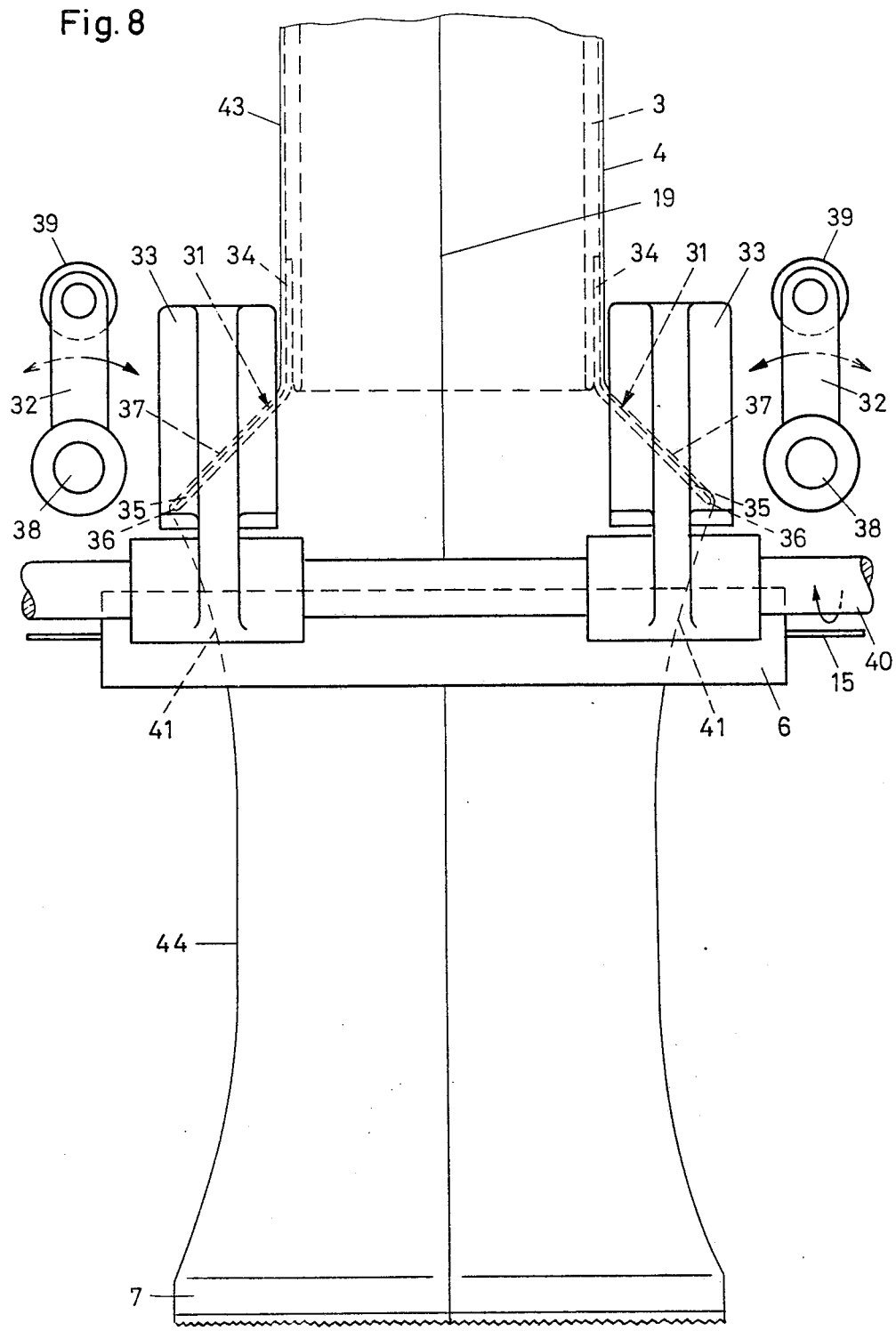

APPARATUS FOR FORMING, FILLING AND CLOSING BAGS

BACKGROUND OF THE INVENTION

This invention relates to an apparatus for forming, filling and closing bags. The apparatus has a hollow mandrel of rectangular cross section on which a thin, weldable or sealable sheet is formed. The sheet is advanced to the mandrel by a folding device. In consecutive operational cycles, bags are formed from the hose by providing transverse seams thereon; the bags are filled by a dispensing device and subsequently, the filled bag is separated from the hose by severing it through a transverse seam. For providing the transverse seams, there are arranged two rhythmically upward and downward as well as inward and outward moving, heatable transverse shoes.

A known apparatus of the above-identified type (to be discussed in more detail later) has the disadvantage that the hose is, directly by means of the transverse shoes which hold the hose firmly, pulled downwardly so that the bag, instead of a flat bottom, has a downwardly tapering, wedgelike configuration. Consequently, the bag has to be relatively tall in order to avoid soiling of its walls by the goods in the zone of the subsequently provided transverse seam. The bag can thus be filled only to a small extent, resulting in a waste of the packaging sheet. Furthermore, the bags are aesthetically objectionable.

SUMMARY OF THE INVENTION

It is an object of the invention to provide an improved apparatus of the above-outlined type from which the discussed disadvantages are eliminated.

This object and others to become apparent as the specification progresses, are accomplished by the invention, according to which, briefly stated, the apparatus for forming, filling and closing bags has a hollow mandrel on which a hose is continuously formed from a sheet; two vertically reciprocating and horizontally oppositely movable shoes underneath the mandrel for cyclically pressing together a first hose portion and providing a transverse seam thereacross as the hose and the shoes move downwardly in unison; a folding device cyclically forming bottom flaps from a second hose portion at opposite sides of the hose at the lower end of the mandrel above the first hose portion; a clamping device for firmly grasping the hose at the second hose portion and backing the bottom flaps along the entire hose cross section as it pulls the hose downwardly from the mandrel while moving simultaneously downwardly with the shoes and while the hose part that terminates at the bottom flaps is being filled with goods by gravity; and a cutting device for cutting through the transverse seam when the shoes and the clamping device have pulled the hose to a predetermined low position for severing a previously filled hose portion as a separated, sealed bag from the upstream, still coherent hose.

The bag flaps which extend as edge flaps along the large sides of the bottom or as ears over the short side of the bottom, form the bottom which is flattened out over the entire hose cross section, so that in contradistinction to the abovementioned known apparatus, the bags may be deposited in an upright orientation. The formation of edge folds along the long side of hose bags is, in itself, known, as disclosed, for example, in Swiss Pat. Nos. 542,701 and 574,806 to which correspond, respectively, U.S. Pat. Nos. 3,774,509 and 3,973,474. In these apparatuses, however, in the lower portion of the hollow mandrel special folding devices had to be provided which constitute an obstruction for the filling operation so that these known apparatuses are only adapted to manufacture empty bags and consequently they cannot meet the object of the present invention.

BRIEF DESCRIPTION OF THE DRAWINGS

FIG. 2 is a perspective view of some of the components of a first preferred embodiment of the invention.

FIGS. 3, 4 and 5 are sectional side elevational views of the first preferred embodiment in three different operational positions.

FIG. 7 is a perspective view of several components of a second preferred embodiment of the invention.

FIG. 8 is a front elevational view of the second preferred embodiment.

DESCRIPTION OF THE PREFERRED EMBODIMENTS

Figure 1:
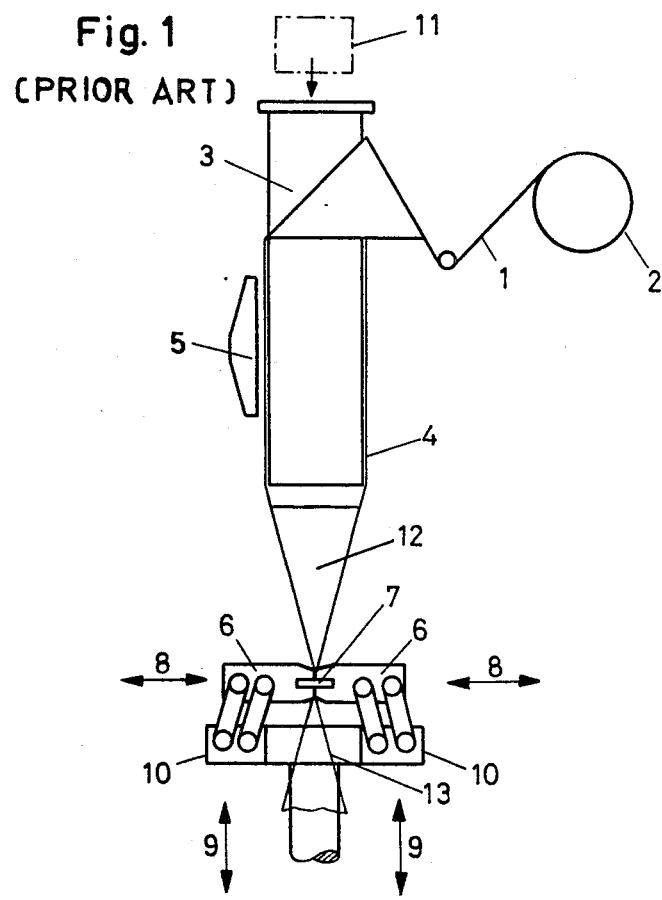
FIG. 1 is a schematic side elevational view of an apparatus for forming, filling and closing bags according to the prior art.

FIG. 1 illustrates an apparatus according to the prior art. A thin sheet 1 made of weldable synthetic material or paper coated with a sealable layer is advanced from a supply roll 2 to a folder box (not shown) which surrounds a hollow mandrel 3 of rectangular cross section. At the lower end of the hollow mandrel 3 the sheet 1 is pulled downwardly and in this manner a hose 4 is formed therefrom. A longitudinal heater 5 serves for forming a longitudinally extending seam which bonds the free longitudinal edges of the sheet to one another to thus form a hose from the sheet. Below the hollow mandrel 3 there is arranged a pair of electrically heatable transverse shoes 6 which are shown in the operative position, that is, in their operational phase as they form a transverse seam 7. The shoes 6 which are movable horizontally as indicated by the doubleheaded arrows 8, are articulated to a piston 10 which, in turn, is movable vertically as indicated by the doubleheaded arrows 9. The shoes 6 press the hose 4 together slightly underneath the mandrel 3 and then pull it downwardly, whereby an approximately wedge-shaped hose configuration is obtained. Simultaneously, above the mandrel 3 a dispensing device 11 is opened which causes flowable material (powder, granules or liquid) to drop into the bag 12 formed as described. When the shoes 6 have completed their downward pulling motion, a cutter (not shown) cuts through the transverse seam 7 in the middle, so that the previously formed, filled bag 13 which is closed by the lower portion of the transverse seam 7, is severed from the new bag 12. The shoes 6 then move horizontally away from one another and are displaced simultaneously upwardly to repeat their cycle, that is, to press together again portions of the hose 4 as described above.

The above-outlined known apparatus has the disadvantage that the substantially variable bag cross section cannot be filled to a sufficient extent. Should an attempt be made to increase the quantity of the filled goods, the filled height will rapidly be of such a magnitude that the sheet zone in which the new transverse seam is to be formed is soiled by the goods. Further, the bag cannot be deposited in an upright standing manner. These disadvantages are eliminated in the apparatus structured according to the invention and illustrated in FIGS. 2 to 6 which show a first preferred embodiment.

Figure 6:
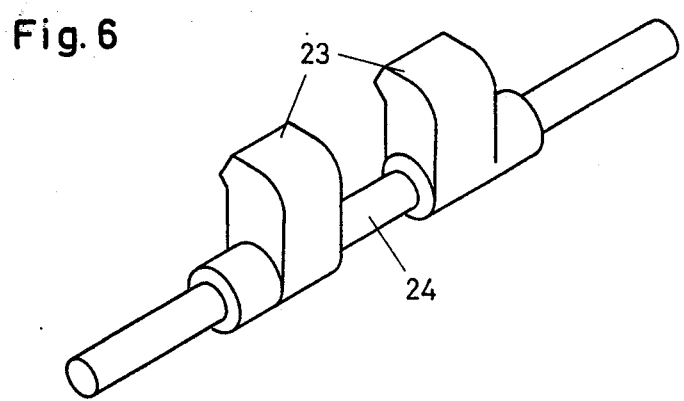
FIG. 6 is a perspective view of one component of the first preferred embodiment.

Turning now to FIGS. 2 to 6, the apparatus illustrated therein has, similarly to the prior art arrangement, a hollow mandrel 3 which serves for forming a hose 4. Also, two transverse shoes 6 are arranged for horizontal and vertical displacement. In a longitudinal slot 14 of one of the transverse shoes 6 there is accommodated a knife 15 which, for severing the transverse seam, is moved into an oppositely located longitudinal slot 16 of the other transverse shoe 6. The withdrawn position and the operative (advanced) position of the knife 15 may be best seen in FIGS. 4 and 5, respectively. There is further provided a pair of pinch folders 17 (FIG. 2) in a known manner underneath the hollow mandrel 3. The pinch folders 17 are movable horizontally towards a short side 18 of the hose 4 in order to provide, in the zone of the transverse seam, an inwardly oriented pinch fold. A corresponding pair of pinch folders are also provided for the oppositely located short side of the hose 4. The transverse shoes 6 may be heated with electric resistances (not shown) or, in the alternative, only one of the shoes is heated in which case the other serves as a backup support. The longitudinal heater 5 serves for forming an overlap seam 19; it may, however, be designed to make a fin-shaped seal instead. The dispensing device 11 which is arranged within the hollow mandrel 3 is formed, for example, of a supply pipe 21 provided with a dosing worm 20. At the lower or outlet terminus of the pipe 21 there is provided a gate 22. Externally of the transverse shoes 6 there are provided two pairs of clamping fingers 23 which are pivotal about the axes of respective shafts 24 which extend parallel to the length dimension of the transverse shoes 6. One of the shafts 24, together with its two fingers 23, is shown in FIG. 6 in perspective illustration. A conventional drive pivots the two fingers on the one and the other side of the hose 4 simultaneously and in opposite direction. The distance between the two fingers 23 and their dimensions are so selected that upon pivoting them inwardly (towards one another) they extend through two recesses 25 provided at both long lower edges 26 of the hollow mandrel 3. The recesses 25 are particularly well seen in FIG. 2; in FIGS. 3, 4 and 5, for a better illustration, the sectional plane of the drawings passes through the recesses 25. In addition to an oscillating motion, the shafts 24 are movable synchronously with the transverse shoes 6 horizontally and vertically.

Figure 4:
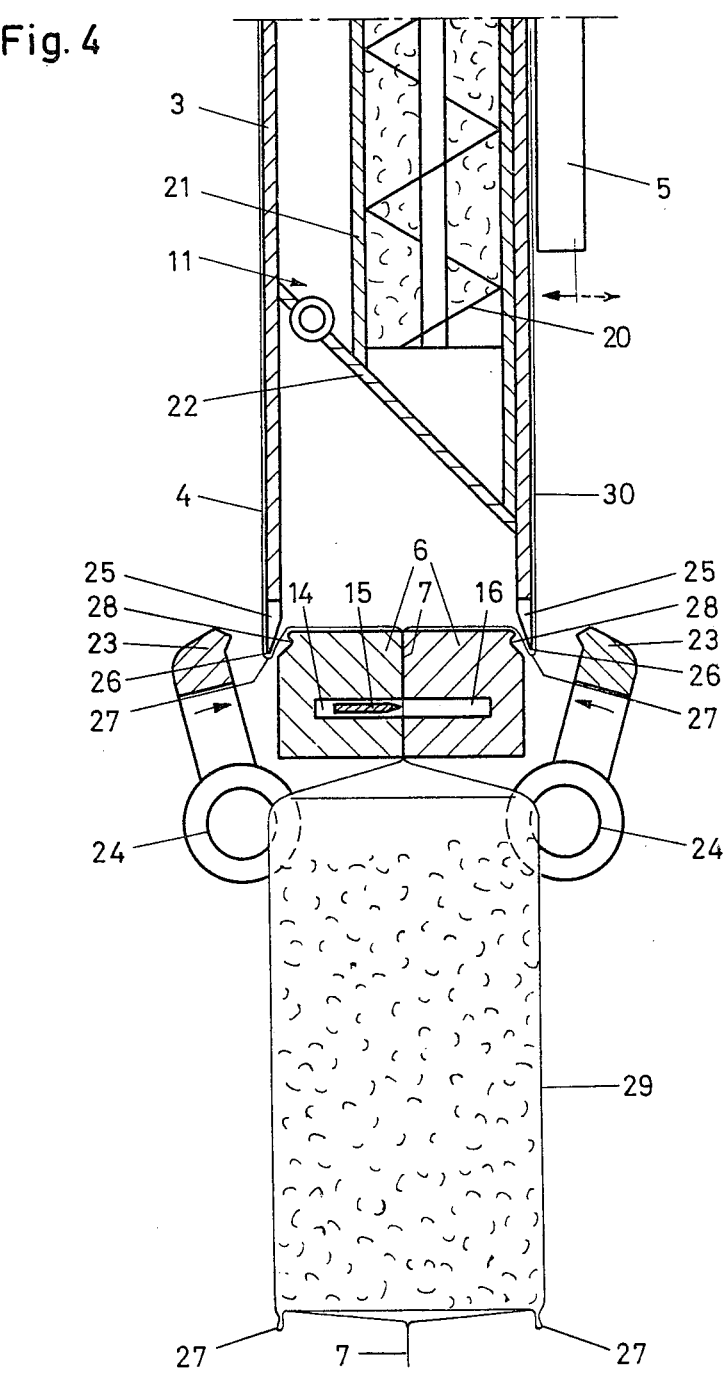

FIG. 3 illustrates an operational phase in which — after actuation of the pinch folder 17 (FIG. 2) — the transverse shoes 6 begin to press together the hose 4. After forming the transverse seam 7, the transverse shoes 6 are, as shown in FIG. 4, lifted to such an extent that in the hose 4, at the lower edges 26 of the long sides of the hollow mandrel 3, edge folds 27 are formed. Now the two pairs of clamping fingers 23 are pivoted inwardly so that they press, in the zone of the recesses 25 of the mandrel 3, the edge folds 27 into grooves 28 which are provided in the transverse shoes 6. The transverse shoes 6 and the clamping fingers 23 which thus firmly press the edge folds 27 against grooves 28, are thereafter pulled downwardly until, in their lowermost position (as shown in FIG. 5), the knife 15 severs the transverse seam 7 and thus separates the previously filled bag 29 from a new bag 30. By opening the gate 22 and rotating the dosing worm 20, the new bag 30 is being filled. This filling operation may start as early as the beginning of the above-described downward pull of the hose 4 by the edge folds 27. During the entire filling operation the bag 30 maintains its full rectangular cross section. The drop of the goods has no adverse effect on the bottom of the bag, because the bottom lies, with its entire face, on the supporting upper surface of the transverse shoes 6 as may be well observed in FIG. 5. Upon completion of the filling operation, the transverse shoes 6 and the clamping fingers 23 are again brought into their position shown in FIG. 3 in order to form, fill and seal a further bag. The obtained bags are well filled and may be deposited in an upright position on the long-side edge folds 27. A soiling of the bag walls in the zone of the transverse seam formation is positively avoided.

Figure 9:
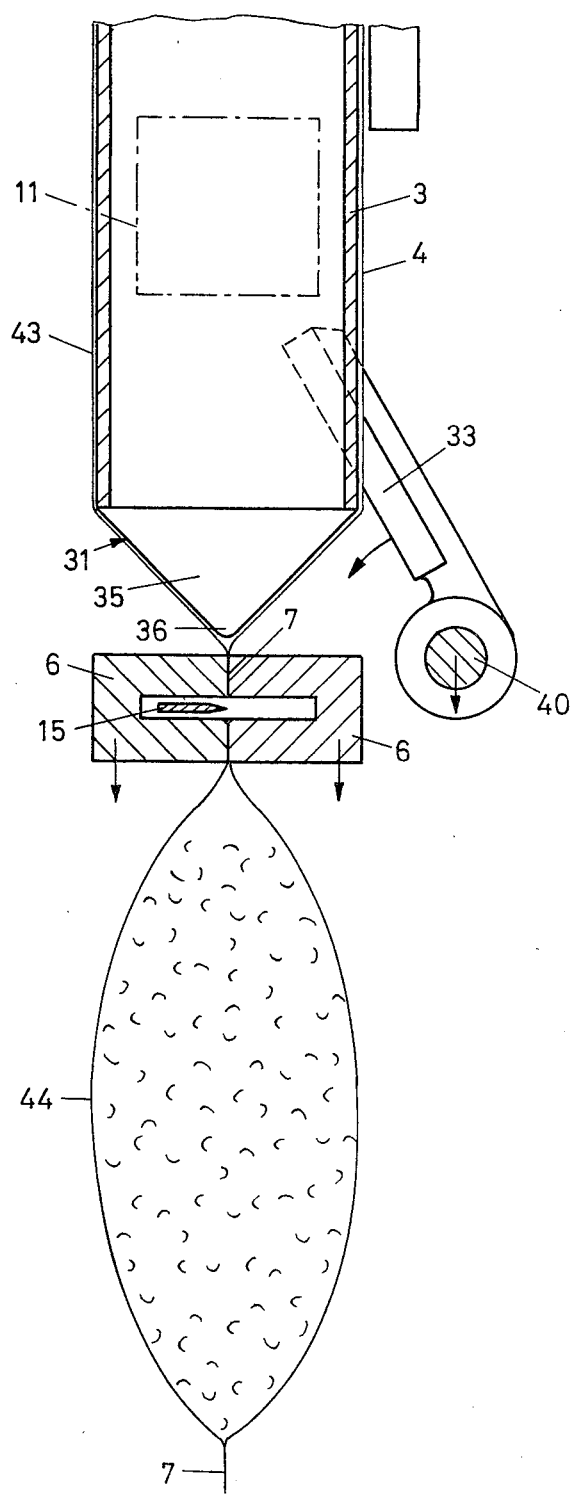
FIG. 9 is a sectional side elevational view of the second preferred embodiment.

Turning now to FIGS. 7, 8, 9 and 10, the apparatus illustrated therein is adapted to make cushion-shaped packages. These, similarly to the filled bags prepared by the machine described in connection with FIGS. 2 to 6 and unlike the bags made, filled and closed by the conventional apparatus shown in FIG. 1, are filled to a substantial degree and the zones where the seams are to be provided remain unsoiled. FIG. 7 shows the hollow mandrel 3, on which the hose 4 is formed by providing thereon the longitudinal seam 19. The two transverse sealing shoes 6 form the transverse seam 7 (FIG. 9). Instead of the pinch folder 17 shown in the previously described preferred embodiment, there are provided spreaders 31 and control arms 32 cooperating therewith. Further, instead of the clamping fingers 23 of the previously described preferred embodiment, there are provided ear clamps 33. As seen in FIG. 8, each spreader 31 has a spring strip which has a securing part 34 and a spreader part 35. The securing part 34 is arranged in a recess at the outside of the short sides of the lower end of the hollow mandrel 3. The depth of the recess corresponds to the thickness of the securing component 34. The spreader component 35 is of triangular shape and terminates symmetrically in a slightly rounded edge 36 as also shown, for example, in FIG. 9. When the resilient spreader 31 is not under load, its spreader part 35 has an outward inclination with respect to the securing component 34, so that it spreads outwardly one triangular part 37 of the short lateral wall of the hose 4 as shown in FIG. 7. As shown in FIGS. 7, 8 and 9, the transverse sealing shoes 6 press the hose 4 together immediately underneath the outwardly spread lateral wall portions 37 in order to form the seam 7.

Figure 10:
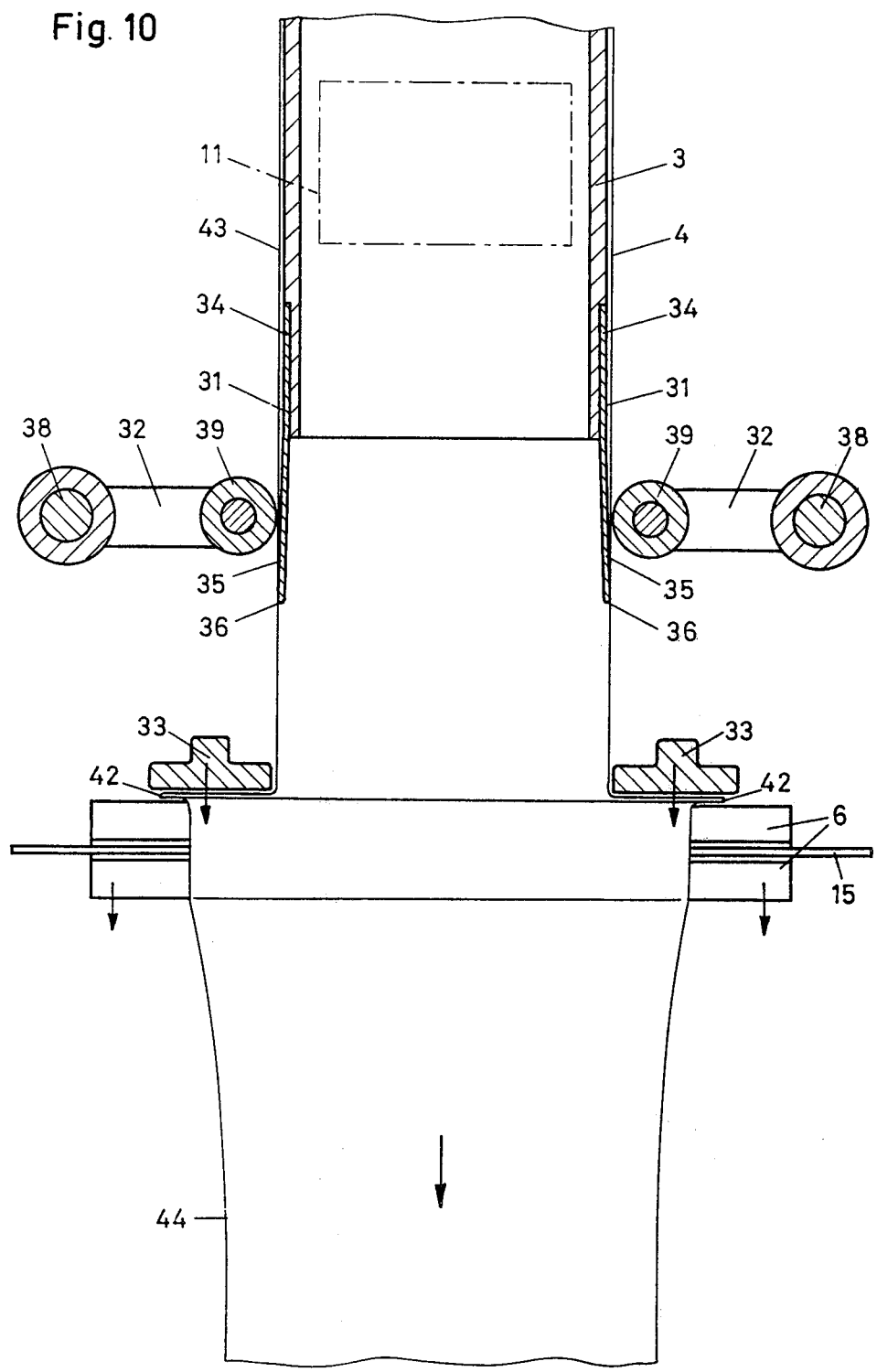
FIG. 10 is a sectional front elevational view of the second preferred embodiment depicting an operational position different from that shown in FIG. 8.

The two control arms 32 are pivotal in opposite directions by a conventional drive about two stationary shafts 38 and are provided with rollers 39 at their free ends, remote from the respective shafts 38. The two ear clamps 33 are, in turn, affixed to a common shaft 40 which is, together with the transverse shoes 6, movable up and down. Subsequently, or even during the welding or sealing of the transverse seam 4, the ear clamps 33 are downwardly pivoted into engagement with upper faces of the transverse shoes 6, whereby the clamps 33 press the lateral wall portions 37 and the lateral wall portions 41 lying therebelow and terminating in corners 36, firmly against the shoes 6. The lateral wall portions 37 and the lateral wall portions 41 disposed therebelow then constitute two outwardly extending "ears" 42 (as shown in FIG. 10) which are held firmly by the ear clamps 33 against the shoes 6.

During downward pivotal motion of the ear clamps 33, the spreader components 35 are swung inwardly and downwardly by the respective ear clamps 33 and are thus brought into alignment with the respective securing components 34. In order to prevent that during downward motion of the shoes 6 and the ear clamps 33, the spreader components 35, due to their own resiliency, again assume their spreading position (such an occurrence would deform the corresponding hose walls), the control arms 32 are pivoted downwardly so that their rollers 39 maintain the spreader components in the above-noted, downwardly swung position. Consequently, the hose 4 may be pulled downwardly without obstruction at the ears 42. During the downward motion of the shoes 6 and the ear clamps 33, the entire cross section of the approximately cushion-shaped bag 43 under formation remains free all the way down, so that it can be filled to a high degree. The dispensing device 11 may begin the delivery of goods as early as the beginning of the downward pulling motion and the filling operation is terminated when the transverse shoes 6 and the ear clamps 33 reach their lowest position (not shown). In such lowest position, the knife 15 is actuated in order to sever the transverse seam 7 and thus separate the previously filled bag 44 from a new bag 43. It is apparent that for repeating the above-described cycle of operation, first the shoes 6, together with the clamps 33, have to be displaced upwardly and the control arms 32 have to be pivoted away from the spreaders 31.

According to a modification (not shown) of the embodiment shown in FIGS. 7 to 10, the ear clamps, instead of being arranged on a common shaft 40 extending parallel to the transverse shoes 6, are pivotal in opposite direction on two separate shafts arranged perpendicularly to the transverse shoes 6. It is further feasible to arrange the rollers 39 not on the two oppositely moving pivotal control arms 32, but on two pins affixed to an upwardly and downwardly movable control strip.

Figure 11:
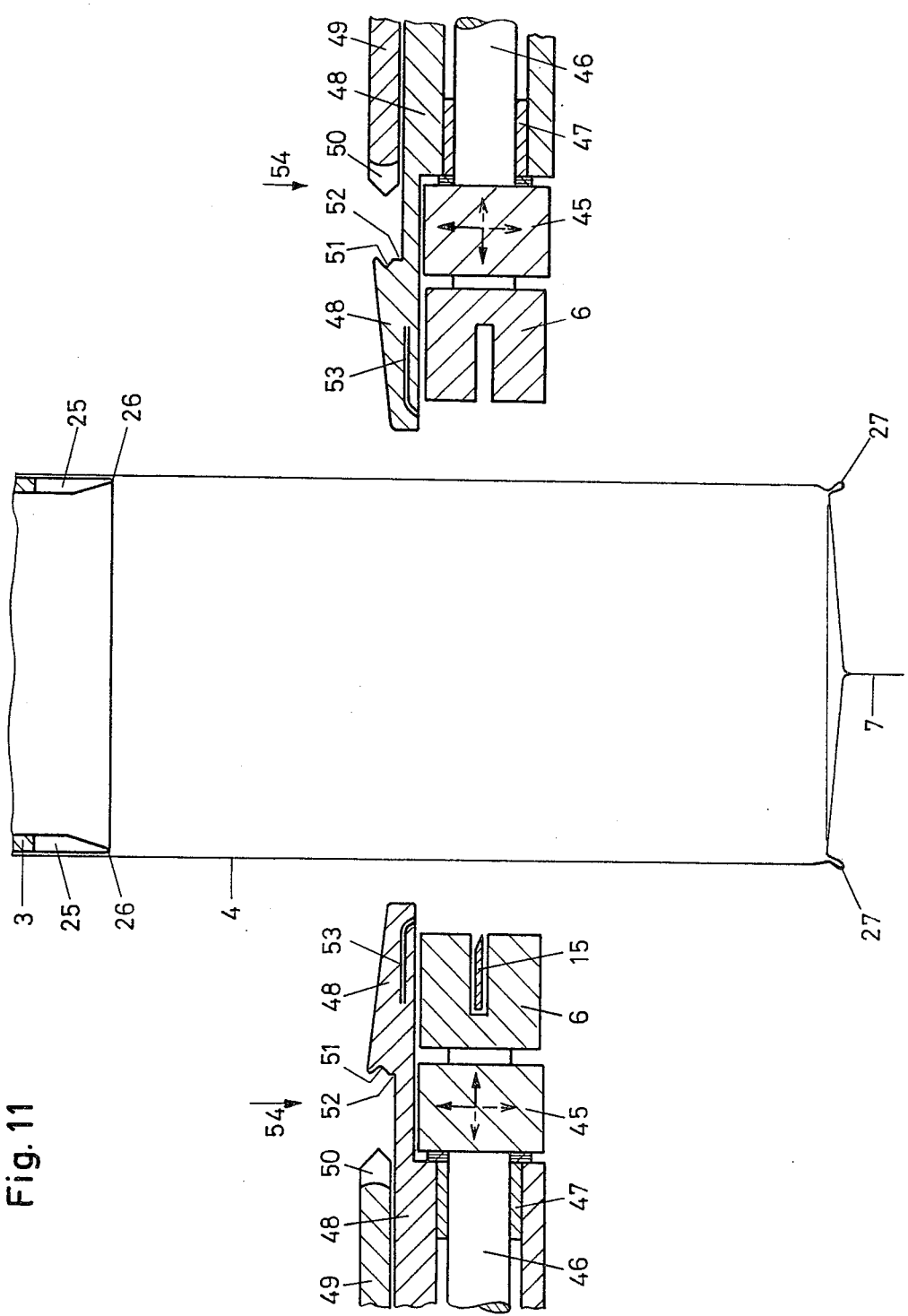
FIGS. 11, 12 and 13 are side elevational sectional views of a third preferred embodiment of the invention, illustrating the different operational positions.
Figure 12:
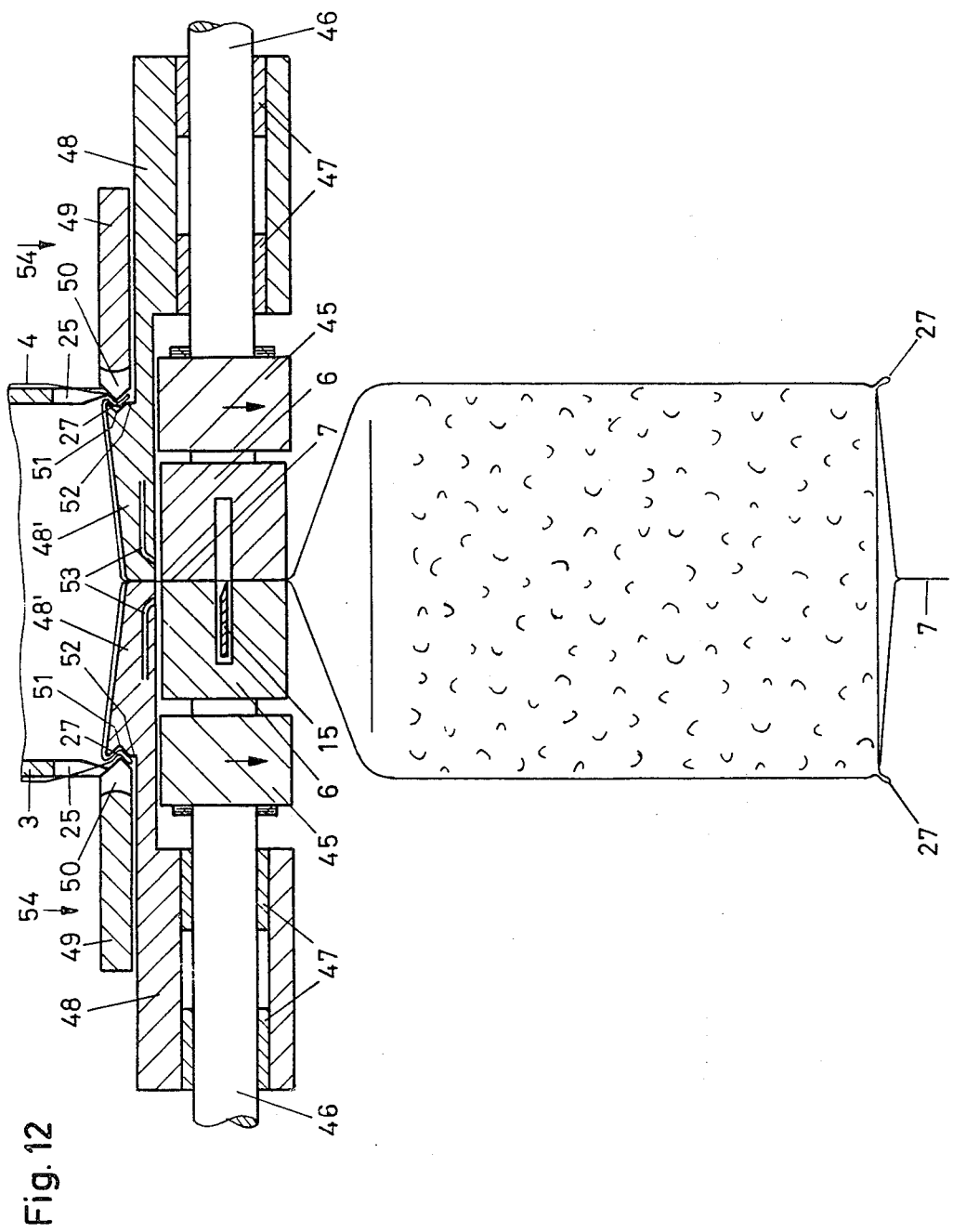
Figure 13:
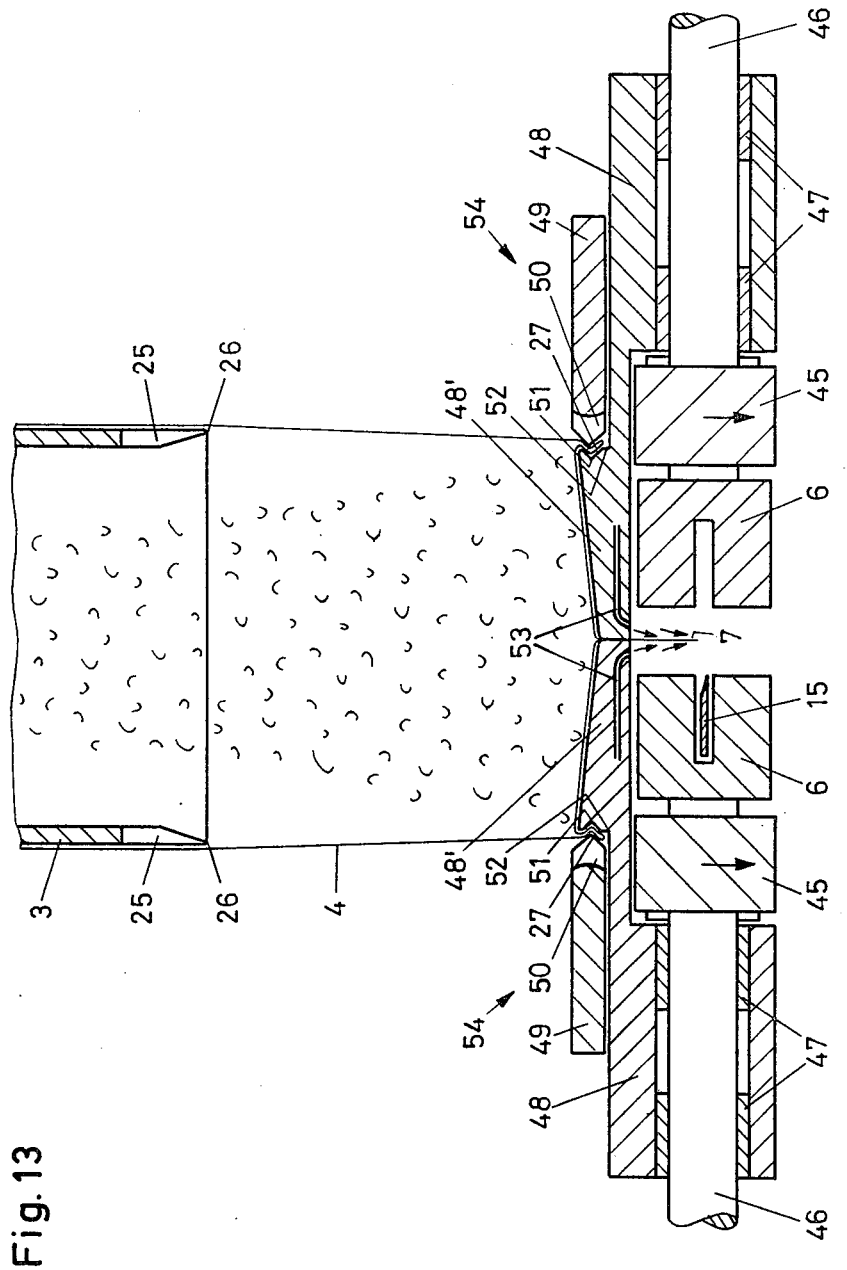

Turning now to the embodiment illustrated in FIGS. 11, 12 and 13, the apparatus has, in addition to the heated transverse shoes 6, two pressing shoes 48' which are arranged immediately above the respective heated shoe 6 and with which the hose 4 may be maintained in a clamped position after the transverse shoes 6 have been moved from one another. This arrangement has the advantage that a better cooling of the transverse seam 7 is ensured and, accordingly, the operational speed of the apparatus may be increased. This cooling is particularly of advantage if uncoated sheets made of thermoplastic material such as polyethylene or the like are used in the manufacturing of bags.

Each transverse shoe 6 is secured to a separate carrier 45 which extends parallel to the lower edges 26 of the large side of the hollow mandrel 3 and which is movable parallel to itself in vertical and horizontal directions. A separate carriage 48 is provided on either large side of the mandrel 3 and is guided, in a direction perpendicular to the large side of the mandrel 3, on two parallel arranged rails 46 (which are in an overlapping relationship in the drawing) by means of bearing sleeves 47. The carriage 48 and a pressing shoe 48' constitute a one-piece component. On the carriage 48 there is slidably mounted, for movement in the same direction, a toothed rack 49 having two teeth 50 which may project through the two recesses 25 at the lower edge 26 of the mandrel 3. Opposite the two teeth 50 there is arranged a groove 51 which is provided in a rear shoulder 52 of each pressing shoe 48'. In each pressing shoe 48' there are further provided channels 53 (only partially shown) which are connected with a conduit (not shown) for supplying cooling air.

The two assemblies 54, each having a transverse shoe 6, a pressing shoe 48' and a toothed rack 49, are, from the position shown in FIG. 11, lifted and inwardly moved into a position shown in FIG. 12. During this motion, the pressing shoes 48' lead the transverse shoes 6. Before this displacement, pinch folders (which are not shown and which are similar to component 17 of FIG. 2) have been actuated. Similarly to the first described embodiment, a bag bottom is formed with two edge folds 27. The latter are, in the zone of the recesses 25, firmly clamped into the grooves 51 by the teeth 50 of the toothed rack 49. Thereafter, the transverse shoes 6 are pressed to one another to form the transverse seam 7. When the assemblies 54 are now moved downwardly, they pull the hose 4 downwardly at the edge folds 27 and, at the same time, the filling operation starts. The transverse shoes 6 can be moved away from one another as early as shortly before the downward motion, since the pressing shoes 48' support the bag bottom and thus prevent a separation of the still soft transverse seam 7 which previously has been cut through by the knife 15. The upper portion of the transverse seam, which still forms part of the new bag 55 under formation, is, during the downward motion of the assemblies 54, cooled very effectively by the air emitted from the channels 53. This is of particular importance in case polyethylene or similar synthetic sheets are used. Instead of obtaining the cooling air from channels 53, such air may also be blown parallel to the transverse shoes 6. In any event, the cooling of the transverse seam 7 would, even in the absence of cooling air, occur faster than if the transverse shoes 6 separate only in their lowest position.

The assemblies 54 may be provided with ear clamps instead of toothed racks 49; in such a case, similarly to the second embodiment, spreaders and associated control components have to be used.

It will be understood that the above description of the present invention is susceptible to various modifications, changes and adaptations and the same are intended to be comprehended within the meaning and range of equivalents of the appended claims.

What is claimed is:

1. In an apparatus for forming, filling and closing bags in a continuous, cyclic operation, including a substantially vertically oriented hollow mandrel of rectangular cross section having two opposite long sides, two opposite short sides and low terminal edges defining a lower mandrel terminus; means for continuously forming a hose about the mandrel from a sheet being advanced thereto; two transverse shoes arranged for vertical reciprocation between an upper location at the lower terminus of the mandrel and a location spaced vertically downwardly from the upper location; the transverse shoes being further arranged for horizontal reciprocation towards and away from one another for pressing together a first hose portion in the upper location, providing a transverse seam thereon and subsequently releasing the hose at a location spaced vertically downwardly from the upper location; a dispensing device filling a hose portion, terminating at the transverse seam, with goods by gravity; and a cutting device for cutting through the transverse seam at a location spaced vertically downwardly from the upper location for severing a filled and sealed hose portion, constituting a bag, from the hose; the improvement comprising (a) folding means for engaging, at said upper location, opposite sides of a second hose portion situated immediately above the first hose portion for forming inwardly oriented bottom flaps of the second hose portion;

(b) means defining openings provided in said long sides of said mandrel in the vicinity of said terminal edges;

(c) means defining grooves provided in said transverse shoes; said grooves being in alignment with a respective said opening when said transverse shoes are in said upper location;

(d) clamping means arranged for vertical reciprocation between said upper location and a location spaced vertically downwardly from said upper location; said clamping means including a clamping finger arranged laterally of either of said long sides and arranged to be movable to project through the respective opening in said mandrel and engage into the respective groove in said transverse shoe for clamping the hose thereagainst; the clamping fingers and the grooves constituting means for firmly grasping the hose at the bottom flaps thereof and pulling downwardly said hose upon movement of said clamping means and said transverse shoes downwardly from said upper location; and (e) backup means arranged for vertical reciprocation between said upper location and a location spaced vertically downwardly from said upper location for maintaining said bottom flaps in a spread-out state along the entire cross section of the hose during the downward movement of said clamping means.

2. In an apparatus for forming, filling and closing bags in a continuous, cyclic operation, including a substantially vertically oriented hollow mandrel of rectangular cross section having two opposite long sides and two opposite short sides; means for continuously forming a hose about the mandrel from a sheet being advanced thereto; two transverse shoes arranged for vertical reciprocation between an upper location at a lower terminus of the mandrel and a location spaced vertically downwardly from the upper location; the transverse shoes being further arranged for horizontal reciprocation towards and away from one another for pressing together a first hose portion in the upper location, providing a transverse seam thereon and subsequently releasing the hose at a location spaced vertically downwardly from the upper location; a dispensing device filling a hose portion, terminating at the transverse seam, with goods by gravity; and a cutting device for cutting through the transverse seam at a location spaced vertically downwardly from the upper location for severing a filled and sealed hose portion, constituting a bag, from the hose; the improvement comprising (a) folding means for engaging, at said upper location, opposite sides of a second hose portion situated immediately above the first hose portion for forming inwardly oriented bottom flaps of the second hose portion; said folding means comprising a resilient spreader attached at one end to either short side of said mandrel at said lower terminus thereof; each spreader being, in a relaxed state, oriented downwardly and away from said mandrel;

(b) clamping means arranged for vertical reciprocation between said upper location and a location spaced vertically downwardly from said upper location; said clamping means including ear clamps arranged to cooperate, when in said upper location, with a respective said spreader and a respective said transverse shoe for forming said bottom flaps; and means for firmly grasping the hose at the bottom flaps thereof and pulling downwardly said hose upon movement of said clamping means and said transverse shoes downwardly from said upper location;

(c) backup means arranged for vertical reciprocation between said upper location and a location spaced vertically downwardly from said upper location for maintaining said bottom flaps in a spread-out state along the entire cross section of the hose during the downward movement of said clamping means;

(d) control means for maintaining each spreader, in its stressed state, in a downward orientation flush with the respective short side of said mandrel; said control means including a control arm supported adjacent either said spreader; each control arm having a pivotally supported end and a free end and a roller carried at the free end for engagement with the respective spreader; and (e) a shaft supported on said transverse shoes for vertical reciprocation with said transverse shoes as a unit.

3. In an apparatus for forming, filling and closing bags in a continuous, cyclic operation, including a substantially vertically oriented hollow mandrel of rectangular cross section; means for continuously forming a hose about the mandrel from a sheet being advanced thereto; two transverse shoes arranged for vertical reciprocation between an upper location at a lower terminus of the mandrel and a location spaced vertically downwardly from the upper location; the transverse shoes being further arranged for horizontal reciprocation towards and away from one another for pressing together a first hose portion in the upper location, providing a transverse seam thereon and subsequently releasing the hose at a location spaced vertically downwardly from the upper location; a dispensing device filling a hose portion, terminating at the transverse seam, with goods by gravity; and a cutting device for cutting through the transverse seam at a location spaced vertically downwardly from the upper location for severing a filled and sealed hose portion, constituting a bag, from the hose; the improvement comprising (a) folding means for engaging, at said upper location, opposite sides of a second hose portion situated immediately above the first hose portion for forming inwardly oriented bottom flaps of the second hose portion;

(b) clamping means arranged for vertical reciprocation between said upper location and a location spaced vertically downwardly from said upper location; said clamping means including means for firmly grasping the hose at the bottom flaps thereof and pulling downwardly said hose upon movement of said clamping means and said transverse shoes downwardly from said upper location;

(c) backup means arranged for vertical reciprocation between said upper location and a location spaced vertically downwardly from said upper location for maintaining said bottom flaps in a spread-out state along the entire cross section of the hose during the downward movement of said clamping means;

(d) pressing shoes arranged for firmly pressing together the hose immediately vertically above said transverse shoes independently from the horizontal position of said transverse shoes; and (e) securing means mounting said pressing shoes on said transverse shoes for vertical reciprocation with said transverse shoes at a unit and for simultaneous, oppositely oriented horizontal displacement relative to said transverse shoes.

4. An apparatus as defined in claim 3, wherein said mandrel has two opposite long sides and two opposite short sides, and wherein said lower terminus of said mandrel is defined by terminal edges; further comprising means defining openings provided in said long sides of said mandrel in the vicinity of said terminal edges; said clamping means includes, on either said long side of said mandrel, a toothed rack arranged for horizontal and vertical reciprocation; means defining grooves in a rear shoulder of said pressing shoes; said grooves being in alignment with a respective said opening when said pressing shoes are in said upper location; said toothed racks being movable to project, with their teeth, through the respective opening and to engage into the respective groove for clamping said hose, at said second hose portion, firmly against the respective groove; said toothed racks and said grooves forming said means for firmly grasping the hose.

5. An apparatus as defined in claim 3, further comprising cooling means for blowing air between said transverse shoes for cooling an upper part of the seam situated between said transverse shoes during a downward motion thereof in a separated state.

6. An apparatus as defined in claim 5, further comprising means defining channels in said pressing shoes, said channels having outlet openings oriented towards said transverse shoes; the air being blown towards said transverse shoes from said channels.

* * * * *